United States Patent
Fudge et al.

(10) Patent No.: US 8,509,368 B2
(45) Date of Patent: Aug. 13, 2013

(54) SYSTEM AND METHOD FOR CLOCK JITTER COMPENSATION IN DIRECT RF RECEIVER ARCHITECTURES

(75) Inventors: Gerald L. Fudge, Rockwall, TX (US);
Mark A. Chivers, McKinney, TX (US);
Sujit Ravindran, Dallas, TX (US); Alex Yeh, Rockwall, TX (US)

(73) Assignee: L-3 Communications Integrated Systems, L.P., Greenville, TX (US)

( * ) Notice: Subject to any disclaimer, the term of this patent is extended or adjusted under 35 U.S.C. 154(b) by 919 days.

(21) Appl. No.: 12/592,776

(22) Filed: Dec. 2, 2009

(65) Prior Publication Data

US 2010/0189208 A1    Jul. 29, 2010

Related U.S. Application Data

(60) Provisional application No. 61/203,114, filed on Dec. 18, 2008.

(51) Int. Cl.
*H04L 7/00* (2006.01)

(52) U.S. Cl.
USPC ........... 375/371; 375/226; 375/278; 375/284; 375/130

(58) Field of Classification Search
USPC ........................................... 375/371
See application file for complete search history.

(56) References Cited

U.S. PATENT DOCUMENTS

| | | | |
|---|---|---|---|
| 3,766,480 A * | 10/1973 | Belloc et al. | 375/329 |
| 5,014,018 A | 5/1991 | Rodwell et al. | |
| 5,454,007 A | 9/1995 | Dutta | |
| 6,266,518 B1 | 7/2001 | Sorrells et al. | |
| 6,404,830 B2 | 6/2002 | Wiese et al. | |
| 6,507,624 B1 | 1/2003 | Jachim et al. | |
| 6,574,459 B1 | 6/2003 | Kaminski et al. | |
| 6,639,537 B1 | 10/2003 | Raz | |
| 6,678,512 B1 | 1/2004 | Kaminski et al. | |
| 6,700,388 B1 | 3/2004 | Mayor et al. | |
| 6,900,710 B2 | 5/2005 | Agoston et al. | |
| 6,975,255 B1 | 12/2005 | Zhang | |
| 7,107,033 B2 | 9/2006 | du Toit | |
| 7,436,910 B2 | 10/2008 | Fudge et al. | |
| 7,436,911 B2 | 10/2008 | Fudge et al. | |

(Continued)

FOREIGN PATENT DOCUMENTS

EP    1330036 A1    7/2003

OTHER PUBLICATIONS

Tarczynski et al., "Optimal Periodic Sampling Sequences for Nearly-Alias Free Digital Signal Processing", IEEE, 2005, 4 pgs.

(Continued)

*Primary Examiner* — Lihong Yu
(74) *Attorney, Agent, or Firm* — Egan, Peterman & Enders LLP.

(57) ABSTRACT

Systems and methods that provide clock jitter compensation architectures that improve the performance of direct radio frequency (RF) receivers by injecting a calibration tone into the received radio frequency (RF) signals in order to help identify and then compensate for the clock jitter noise. After injecting the tone, the jitter noise going through the direct RF bandpass sampling receiver is estimated using a narrow bandwidth filter, and the received signals are further processed and demodulated depending on the Nyquist zone of the received signal. The relative modulation factor for the modulation is computed and then applied to the Nyquist zone to de jitter that particular Nyquist zone.

26 Claims, 7 Drawing Sheets

(56) References Cited

U.S. PATENT DOCUMENTS

| | | | |
|---|---|---|---|
| 7,436,912 | B2 | 10/2008 | Fudge et al. |
| 7,489,745 | B2 | 2/2009 | Fudge |
| 2002/0092023 | A1 | 7/2002 | Kaizu et al. |
| 2002/0161300 | A1 | 10/2002 | Hoff et al. |
| 2003/0016762 | A1 | 1/2003 | Martin et al. |
| 2003/0054783 | A1 | 3/2003 | Mason et al. |
| 2005/0069046 | A1 | 3/2005 | Tsui et al. |
| 2005/0117069 | A1 | 6/2005 | McNeely |
| 2006/0133470 | A1 | 6/2006 | Raz et al. |
| 2007/0081578 | A1* | 4/2007 | Fudge et al. ................. 375/130 |

OTHER PUBLICATIONS

Artyukh et al., "Wideband RF Signal Digitising for High Pruity Spectral Analysis", International Workshop on Spectral Methods and Multirate Signal Processing, Jun. 2005, 6 pgs.

Arthur, "Modern SAW-based pulse compression systems for radar applications, Part I: SAW matched filters," Electronics & Communication Engineering Journal, Dec. 1995, pp. 236-246.

Arthur, "Modern SAW-based pulse compression systems for radar applications, Part II: Practical systems," Electronics & Communication Engineering Journal, Apr. 1996, pp. 57-78.

Brandl et al., "High Speed Signal Processing with Tapped Dispersive SAW based Delay Lines," University of Technology, Applied Electronics Laboratory, Vienna Austria, IEEE 2000, pp. 171-176.

Burke, "Ultra-Linear Chirp Generation Via VCO Tuning Predistortion," AIL Systems, Inc., Deer Park, New York, IEEE 1994 MTT-S Digest, pp. 957-960.

Gerard et al., "The Design and Applications of Highly Dispersive Acoustic Surface-Wave Filters," Invited Paper, IEEE Transactions on Microwave Theory and Techniques, vol. MTT-21, No. 4, Apr. 1973, pp. 176-186.

Ong et al., "Digital LPI Radar Detector," Naval Postgraduate School Thesis, Monterey, California, Mar. 2001, pp. 1-81.

Grant et al., "Recent Advances in Analog Signal Processing," IEEE 1990, IEEE Transactions on Aerospace and Electronic Systems, vol. 26, No. 5, Sep. 1990, pp. 818-849.

Li et al, "On the Use of a Compressive Receiver for Signal Detection," IEEE 1991, IEEE Transactions on Communications, vol. 39, No. 4, Apr. 1991, pp. 557-566.

Levy et al, "VCO Based Chirp Generation for Broad Bandwidth Compressive Receiver Applications," AIL Systems, Inc., Deer Park, New York, IEEE 1993 MTT-S Digest, pp. 1113-1115.

Lucyszyn, "Review of radio frequency microelectromechanical systems technology," Imperial College, London, IEE Proc.-Sci. Meas. Technol.vol. 151, No. 2, Mar. 2004, pp. 93-103.

Lyons et al., "High Temperature Superconductive Wideband Compressive Receivers," Analog Device Technology Group, Lincoln Laboratory, Invited Paper, IEEE Transactions on Microwave Theory and Techniques, vol. 44, No. 7, Jul. 1996, pp. 1258-1278.

Unser, "Sampling—50 Years After Shannon," Swiss Federal Institute of Technology, Lausanne, Switzerland, IEEE 2000 Proceedings of the IEEE, vol. 88, No. 4, Apr. 2000, pp. 569-587.

Sengupta et al, "Novel Ferroelectric Materials for Phased Array Antennas," U.S. Army Research Laboratory, Aberdeen Proving Groud, 1997 IEEE, IEEE Transactions on Ultrasonics, Ferroelectrics, and Frequency Control, vol. 44, No. 4, Jul. 1997, pp. 792-797.

Serhan et al., "Automatic Frequency Control Techniques for Microwave Active Filters," Limoges University, Limoges, France, 1997 IEEE MTT-S Digest, pp. 697-700.

Whittaker et al, "Digital chirp filter processing for improved performance of sweeping spectrum analysers," University of Surrey, Surrey, UK, Electronics Letters, Aug. 3, 2000, vol. 36, No. 16, pp. 1430-1432.

Agoston et al, "100 GHz Through-Line Sampler System with Sampling Rates in Excess of 10 G samples/second," Picosecond Pulse Labs, Boulder, Colorado, PSPL-100 Sampler Paper—Submitted to MTT 2003, http://www.picosecond.com->products->sampler modules, 3 pgs.

Akbari-Dilmaghani et al, "A High Q RF CMOS Differential Active Inductor," Imperial College, London, 1998 IEEE International Conference on Electronics, Circuits and Systems, vol. 3, Sep. 7-10, 1998, pp. 157-160.

Akos et al, "Direct Bandpass Sampling of Multiple Distinct RF Signals," 1999 IEEE Transactions on Communications, Vo. 47, No. 7, Jul. 1999, pp. 983-988.

Behbahani et al, "A Broad-Band Tunable CMOS Channel-Select Filter for a Low-IF Wireless Receiver," 2000 IEEE Journal of Solid-State Circuits, vol. 35, No. 4, Apr. 2000, pp. 476-489.

Brown et al, "Digital L-Band Receiver Architecture with Direct RF Sampling," NAVSYS Corp., Colorado Springs, Colorado, Position Location and Navigation Symposium, IEEE, Apr. 11-15, 1994, pp. 209-216.

Copeland et al, "5-GHz SiGe HBT Monolithic Radio Transceiver with Tunable Filtering," 2000 IEEE Transactions on Microwave Theory and Techniques, vol. 48, No. 2, Feb. 2000, pp. 170-181.

Deleniv et al, "Tunable Ferroelectric Filter-Phase Shifter," University of Technology, Gothenburg, Sweden, 2003 IEEE MTT-S Digest, pp. 1267-1270.

Juodawlkis et al, "Optical Down-Sampling of Wide-Band Microwave Signals," Invited Paper, Journal of Lightwave Technology, vol. 21, No. 12, Dec. 2003, pp. 3116-3124.

Karvonen et al, "A CMOS Quadrature Charge-Domain Sampling Circuit with 66-dB SFDR Up to 100 MHz," 2005 IEEE Transactions on Circuits and Systems-I: Regular Papers, vol. 52, No. 2, Feb. 2005, pp. 292-304.

Koc et al, "Direct RF Sampling Continuous-Time Bandpass /spl Delta/-/spl Sigma/A/D Converter Design for 3G Wireless Applications," ISCAS 2004, May 23-26, 2004, vol. 1, pp. 409-412.

Latiri et al, "A reconfigurable RF sampling receiver for multistandard applications," Comptes Rendus Physique 7 (2006), pp. 785-793.

Lindfors et al, "A 3-V 230-MHz CMOS Decimation Subsampler," 2003 IEEE Transactions on Circuits and Systems—II: Analog and Digital Signal Processing, vol. 50. No. 3, Mar. 2003, pp. 105-117.

Loper, "A Tri-Phase Direct Conversion Receiver," Rockwell International, MILCOM 1990, Sep. 30-Oct. 3, 1990, pp. 1228-1232.

Luy et al, "Configurable RF Receiver Architecture," Daimler-Chrysler Research and Tecnology, Ulm, Germany, 2004 IEEE Microwave Magazine, Mar. 2004, pp. 75-82.

Minnis et al, "A Highly Digitized Multimode Receiver Architecture for 3G Mobiles," 2003 IEEE Transactions on Vehicular Technology, vol. 52, No. 3, May 2003, pp. 637-653.

Mirabbasi et al, "Classical and Modern Receiver Architectures," University of Toronto, 2000 IEEE Communications Magazine, Nov. 2000, pp. 132-139.

Mostafa et al, "WCDMA Receiver Architecture with Unique Frequency Plan," Micro Lnear Corp. San Jose, California and Texas Instruments, Inc., Dallas, Texas, ASIC/SOC Conference, 2001 Proceedings, 14th Annual IEEE International, Sep. 12-15, 2001, pp. 57-61.

Muhammad et al, "Direct RF Sampling Mixer With Recursive Filtering in Charge Domain," Texas Instruments Incorporated, Dallas, Texas, ISCAS, May 23-26, 2004, vol. 1, pp. 577-580.

Namgoong et al., "Direct-Conversion RF Receiver Design," 2001 IEEE Transactions on Communications, vol. 49, No. 3, Mar. 2001, pp. 518-529.

Pellon, "RF-to-Digital Receivers Employing Bandpass Multibit /spl Sigma//spl Delta/ ADC Architectures," Lockheed Martin Government Electronic Systems, Morristown, New Jersey, 20th Annual Gallium Arsenide Integrated Circuit (GaAs IC) Symposium, Nov. 1-4, 1998, pp. 11-14.

"Real-Time Sampling Downconverter Front Ends for Digital Radar and Wide-Bank Signaling," Picoscond Pulse Labs, 2500 55th Street, Boulder, CO 80301, (Nov. 2004).

Richter et al, "An Integrated Wideband-IF-Receiver Architecture for Mobile Terminals," Dresden University of Technology, Dresden, Germany, 2003 IEEE Radio Frequency Integrated Circuits Symposium, Jun. 8-10, 2003, pp. 583-586.

Shoji et al, "70-GHz-Band MMIC Transceiver With Integrated Antenna Diversity System: Application of Receive-Module-Arrayed Self-Heterodyne Technique," 2004 IEEE Transactions on Microwave Theory and Techniques, vol. 52, No. 11, Nov. 2004, pp. 2541-2549.

Springer et al, "RF System Concepts for Highly Integrated RFICs for W-CDMA Mobile Radio Terminals," 2002 IEEE Transactions on Microwave Theory and Techniques, vol. 50, No. 1, Jan. 2002, pp. 254-267.

Tatu et al, "Ka-Band Direct Digital Receiver," 2002 IEEE Transactions on Microwave Theory and Techniques, vol. 50, No. 11, Nov. 2002, pp. 2436-2442.

Tayebati et al, "Microelectromechanical tuneable filters with 0.47 nm linewidth and 70nm tuning range," Electonics Letters, Jan. 8, 1998, vol. 34, No. 1, pp. 76-78.

Thor et al, "A Direct RF Sampling Multifrequency GPS Receiver," Stanford University, Position Location and Navigation Symposium, 2002 IEEE, Apr. 15-18, 2002, pp. 44-51.

Tsui et al, "Digital Microwave Receiver Technology," Invited Paper, 2002 IEEE Transactions on Microwave Theory and Techniques, vol. 50, No. 3, Mar. 2002, pp. 699-705.

Valkama et al., "Advanced Receiver Architectures and I/Q Signal Processing," Tampere University of Technology, Tampere, Finland, First International Symposium on Control, Communications and Signal Processing, IEEE Jun. 2004, pp. 71-74.

Vaughan et al, "The Theory of Bandpass Sampling," 1991 IEEE Transactions on Signal Processing, vol. 39, No. 9, Sep. 1991, pp. 1973-1984.

Wooten et al, "Rapidly Tunable Narrowband Wavelength Filter Using LiNbO3 Unbalanced Mach-Zehnder Interferometers," Journal of Lightwave Technology, vol. 14, No. 11, Nov. 1996, pp. 2530-2536.

Pepper et al, "NLTLs Push Sampler Products Past 100 GHz," Microwaves & RF, Oct. 2005, 6 pgs.

Model 7620 DCSM VME Card Datasheet, Revision C, Picosecond Pulse Labs, Boulder, Colorado, Sep. 2005, 10 pgs.

Wepman, "Analog-to-Digital Converters and Their Applications in Radio Receivers," 1995 IEEE Communications Magazine, May 1995, pp. 39-45.

U.S. Appl. No. 60/373,163, filed Apr. 17, 2002, "Tunable modules for frequency agile receivers."

Brueller et al, "On Non-uniform Sampling of Signals," Israel Institute of Technology, Haifa, Israel, ISIE, Jul. 7-10, 1998, pp. 249-252.

Candes et al, "Robust Uncertainty Principles: Exact Signal Reconstruction From Highly Incomplete Frequency Information," 2006 IEEE Transactions on Information Theory, Vo. 52, No. 2, Feb. 2006, pp. 489-509.

Donoho, "Compressed Sensing," 2006 IEEE Transactions on Information Theory, vol. 52, No. 4., Apr. 2006, pp. 1289-1306.

Dragotti et al, "Exact Sampling Results for Signals with Finite Rate of Innovation Using Strang-Fix Conditions and Local Kernels," ICASSP 2005, Mar. 18-23, 2005, pp. 233-236.

Dragotti et al, "Wavelet Footprints: Theory, Algorithms, and Applications," 2003 IEEE Transactions on Signal Processing, vol. 51, No. 5, May 2003, pp. 1306-1323.

Duarte et al, "Distributed Compressed Sensing of Jointly Sparse Signals," Rice University, Houston, Texas, Asilomar Conference on Signals, Systems and Computers 2005, Oct. 28-Nov. 1, 2005, pp. 1537-1541.

Gansman et al, "Single Frequency Estimation with Non-uniform Sampling," Asilomar Conference on Signals, Systems and Computers 1996, Nov. 3-6, 1996, vol. 1., pp. 399-403.

Herley et al, "Minimum Rate Sampling and Reconstruction of Signals with Arbitrary Frequency Support," 1999 IEEE Transactions on Information Theory, vol. 45, No. 5, Jul. 1999, pp. 1555-1564.

Kumar et al, "On Distributed Sampling of Bandlimited and Non-Bandlimited Sensor Fields," University of California, Berkeley, California, ICASSP 2004, May 17-21, 2004 vol. III., pp. 925-928.

Lefkaditis et al., Ambiguities in the harmonic retrieval problem using non-uniform sampling, IEE Proceedings—Radar, Sonar and Navigation, Dec. 2001, pp. 325-329.

Maravic et al, "Channel Estimation and Synchronization with Sub-Nyquist Sampling and Application to Ultra-Wideband Systems," ISCAS 2004, May 23-26, 2004, pp. V-381-V-384.

Maravic et al, "Sampling and Reconstruction of Signals With Finite Rate of Innovation in the Presence of Noise," 2005 IEEE Transactions on Signal Processing, vol. 53, No. 8, Aug. 2005, pp. 2788-2805.

Pace et al, "Use of the Symmetrical Number System in Resolving Single-Frequency Undersampling Aliases," 1997 IEEE Transactions on Signal Processing, vol. 45, No. 5, May 1997, pp. 1153-1160.

Sanderson et al, "Reduction of Aliasing Ambiguities Through Phase Relations," 1992 IEEE Transactions on Aerospace and Electronic Systems, vol. 28, No. 4, Oct. 1992, pp. 950-956.

Sayiner et al, "A Non-Uniform Sampling Technique for A/D Conversion," ISCAS 193, May 3-6, 1993, pp. 1220-1223.

Styer et al, "Two Channel RSNS Dynamic Range," 2002 IEEE Transactions on Circuits and Systems—I: Fundamental Theory and Applications, vol. 49, No. 3., Mar. 2002, pp. 395-397.

Vetterli et al, "Sampling Signals With Finite Rate of Innovation," 2002 IEEE Transactions on Signal Processing, vol. 50, No. 6, Jun. 2002, pp. 1417-1428.

Walter, "Non-Uniform Sampling in Wavelet Subspaces," University of Wisconsin, Milwaukee, Wisconsin, ICASSP 1999, pp. 2057-2059.

Xia, "An Efficient Frequency-Determination Algorithm from Multiple Undersampled Waveforms," 2000 IEEE Transactions on Signal Processing Letters, vol. 7, No. 2, Feb. 2000, pp. 34-37.

Xiong et al, "A Non-uniform Sampling Tangent Type FM Demodulation," 2004 IEEE Transactions on Consumer Electronics, vol. 50, No. 3., Aug. 2004, pp. 844-848.

Zhu et al, "Adaptive Non-Uniform Sampling Delta Modulation for Audio/Image Processing," 1996 IEEE Transactions on Consumer Electronics, vol. 42, No. 4, Nov. 1996, pp. 1062-1072.

Weller et al., "Jitter Compensation in Sampling Via Polynomial Least Squares Estimation", 2009, 4 pgs.

Weller et al., "Nonlinear Digital Post-Processing to Mitigate Jitter in Sampling", Sep. 2008, 24 pgs.

Fudge et al., "System and Method for Clock Jitter Compensation in Direct RF Receiver Architectures", U.S. Appl. No. 61/203,114, filed Dec. 18, 2008; 10 pgs.

Fudge et al., "System and Method for Improved Spur Reduction in Direct RF Receiver Architectures", U.S. Appl. No. 61/203,115, filed Dec. 18, 2008; 17 pgs.

Fudge et al., "Multiple Projection Sampling for RF Sampling Receivers", Copending U.S. Appl. No. 13/048,489, filed Mar. 15, 2011, 41 pgs.

Fudge et al., "System and Method for Improved Spur Reduction in Direct RF Receiver Architectures", Copending U.S. Appl. No. 12/592,777, filed Dec. 2, 2009, 29 pgs.

* cited by examiner

SYSTEM AND METHOD FOR CLOCK JITTER COMPENSATION IN DIRECT RF RECEIVER ARCHITECTURES

The present application claims priority to U.S. provisional patent application Ser. No. 61/203,114 filed Dec. 18, 2008 and entitled "SYSTEM AND METHOD FOR CLOCK JITTER COMPENSATION IN DIRECT RF RECEIVER ARCHITECTURES", by Fudge et al., the disclosure of which is incorporated herein by reference in its entirety.

RELATED APPLICATIONS

The present application is related in subject matter to concurrently filed patent application Ser. No. 12/592,777 entitled "SYSTEM AND METHOD FOR IMPROVED SPUR REDUCTION IN DIRECT RF RECEIVER ARCHITECTURES" by Fudge et al., which is incorporated herein by reference in its entirety, and to Provisional Patent Application Ser. No. 61/203,115 filed Dec. 18, 2008 and entitled "SYSTEM AND METHOD FOR IMPROVED SPUR REDUCTION IN DIRECT RF RECEIVER ARCHITECTURES", by Fudge et al., which is also incorporated herein by reference in its entirety.

TECHNICAL FIELD OF THE INVENTION

This invention relates to receiver and transmitter architectures for efficient wireless communications and, more particularly, to direct radio frequency (RF) receiver architectures.

BACKGROUND

A wide variety of signals and related protocols exist for the use of radio frequency (RF) signals in communication systems and other devices, such as radar systems. Prior receiver architectures for such RF communication systems are described in U.S. Pat. No. 7,436,910, entitled "DIRECT BANDPASS SAMPLING RECEIVERS WITH ANALOG INTERPOLATION FILTERS AND RELATED METHODS," and U.S. Pat. No. 7,436,912, entitled "NYQUIST FOLDED BANDPASS SAMPLING RECEIVERS AND RELATED METHODS," each of which is hereby incorporated by reference in its entirety.

FIG. 1 (Prior Art) shows an embodiment for a reconfigurable direct RF bandpass sampling receiver (RDRFBSR), such as those described in U.S. Pat. No. 7,436,910. As depicted, the radio frequency (RF) input signal 116 is first passed through a low noise amplifier (LNA) 102. The output 130 of the LNA 102 is provided to a tunable/switchable bandpass filter 104, which can be configured to have a tunable center frequency and a programmable bandwidth dependent upon one or more filter control signals 105. The filtered output signal 132 is received by the non-quantizing sampler 204, which samples the signals at times determined by the RF sample clock 212 resulting in a discrete time continuous voltage sampled signal. The sampled signal is then filtered by the interpolation filter, resulting in a continuous time continuous voltage signal, which is then sampled and quantized by the ADC 210 at sample rate determined by the ADC Sample Clock 214 after optional amplification by the IF amp 208. The digital output signals from the ADC 210 are then further processed by digital signal processing (DSP) circuitry 114 to produce baseband in-phase path (I) and quadrature path (Q) signals. One limitation of this architecture, however, is that for very high RF input signals and operational conditions, the RF Sample Clock 212 jitter is amplified and may result in subsequent signal distortion in the form of signal spreading in the output signals, leading to significantly reduced SNR.

FIG. 2 (Prior Art) shows an embodiment of a Nyquist folding receiver (NYFR), such as those described in U.S. Pat. No. 7,436,912. The NYFR is similar to the RDRFBSR. Starting with the RDRFBSR, the anti-alias filter is replaced with a wideband pre-select filter, and the constant RF sample clock is replaced with a frequency modulated sample clock that samples the RF input signal at the zero-crossing rising voltage of a frequency modulated clock. In FIG. 2, an ultra wideband (UWB) front end filter 302 is present in front of a non-quantizing RF sampler 204 to allow reception of multiple Nyquist zones. The non-quantizing RF sampler 204 uses modulated RF sample clock circuitry 304, and is followed by an analog interpolation filter 206 and an analog to digital converter (ADC) 210. The ADC 210 receives an ADC sampling clock signal 214 from ADC clock circuitry. The wideband filter 302 has a bandwidth that is wide enough to pass multiple Nyquist zones where the Nyquist zones are determined by the RF sampling clock frequency for the non-quantizing RF sampler 204. The modulated sample clock circuitry 304 provides an RF sampling clock signal to the non-quantizing RF sampler 204 that is not constant and is adjusted or modulated during sampling. As with the RDRFBSR, the NYFR can suffer from clock jitter associated with the RF sampling.

FIG. 3 (Prior Art) shows the input/output characteristics of the NYFR. In particular, an input signal has an induced modulation MΘ(t), where M depends on the Nyquist zone in which the signal originated. Thus, a broadband RF input can be sampled at far less than Nyquist, allowing individual signals from different Nyquist zones to alias (or fold) into the analog interpolation filter. The original RF frequency from which each signal aliased can then be determined without ambiguity by measuring M.

FIG. 4 (Prior Art) illustrates the principles of the NYFR via a frequency domain example. The Fourier transform of the pulse train, shown in the right side of FIG. 4 (Prior Art), is convolved with the input spectra after the wideband RF filter, which is shown at top left. It is noted that the Fourier transform of the pulse train consists of a series of impulse-like signals with increasing width. For example, the width at $0f_{s1}$ is 0; the width at $1f_{s1}$ is the modulation bandwidth; the width at $2f_{s1}$ is 2× the modulation bandwidth; etc. When these are convolved with the input spectra, the resulting spectra has modulation bandwidth corresponding to Nyquist zone of origin as shown in the lower left hand side of FIG. 4 (Prior Art). It is noted that the numbers on the left side of FIG. 4 (Prior Art) correlate to the numbers in FIG. 2 (Prior Art) and show the positions within the circuitry where the signals in FIG. 4 (Prior Art) are present.

As indicated above, the RDRFBSR and NYFR architectures can suffer from clock jitter due to the direct RF sampling. Prior solutions to address clock jitter have attempted to provide model-based approximation techniques that assume the signal takes a known form and then applies a best fit of the data to the known form (e.g., linear least squares, polynomial least squares, etc.). Improved solutions, however, are needed, as these techniques are limited in applicability, difficult to implement, and are computationally expensive.

SUMMARY OF THE INVENTION

The systems and methods disclosed herein provide clock jitter compensation architectures that improve the performance of direct radio frequency (RF) receivers. These disclosed clock jitter compensation architectures advantageously inject a high frequency tone into the received radio frequency (RF) signals in order to help identify and then compensate for the clock jitter noise. After injecting the tone, the jitter noise going through the direct RF bandpass sampling receiver is estimated using a narrow bandwidth filter. This estimation technique is possible because the jitter noise is not white noise, but is actually shaped, as described in more detail below, and because all signals have the same induced jitter phase modulation with only an integer scale factor on the jitter phase varying with Nyquist zone. After the jitter noise is estimated, the received signals are further processed and demodulated similar to the modulation/demodulation used for Nyquist folded receivers (NYFR), where the modulation/demodulation depends on the Nyquist zone of the received signal. With respect to the clock jitter compensation architectures, the relative modulation factor for the modulation is computed and then applied to the Nyquist zone to de jitter that particular Nyquist zone (i.e., to simultaneously de jitter all signals from a given Nyquist zone). Other features and variations can be implemented, as desired, and a related methods and systems can be utilized, as well.

In one respect, disclosed herein is receive path circuitry, including: bandpass sampling receiver circuitry configured to receive a sampling clock and to sample a combined radio frequency (RF) signal using the sampling clock to produce a digital output signal, the combined RF signal including a RF input signal and an injected calibration tone, the calibration tone having known characteristics, and the sampling clock including associated source clock jitter phase modulation $\Theta(t)$ that induces jitter phase modulation $M_1\Theta(t)$ on the calibration tone and jitter phase modulation $M_2\Theta(t)$ on the RF input signal of the digital output signal from the bandpass sampling receiver circuitry; and processing circuitry coupled to receive and process the digital output signal from the bandpass sampling receiver circuitry by using the known characteristics of the calibration tone, to estimate the induced jitter phase modulation $M_1\ \Theta(t)$ on the calibration tone and to identify and compensate for the source clock jitter phase modulation $\Theta(t)$ in the digital output signal from the bandpass sampling receiver circuitry based on the estimated induced jitter phase modulation $M_1\Theta(t)$.

In another respect, disclosed herein is a method for processing a radio frequency (RF) input signal, including: combining a radio frequency (RF) input signal with an injected calibration tone having known characteristics to produce a combined signal including the RF input signal and the calibration tone; bandpass sampling the combined signal according to a sampling clock to produce a bandpass sampled digital signal, the sampling clock including associated source clock jitter phase modulation $\Theta(t)$ that induces jitter phase modulation $M_1\Theta(t)$ on the calibration tone and jitter phase modulation $M_2\Theta(t)$ on the RF input signal of the digital signal; and using the known characteristics of the calibration tone to estimate the induced jitter phase modulation $M_1\ \Theta(t)$ on the calibration tone and to identify and compensate for the source clock jitter phase modulation $\Theta(t)$ in the bandpass sampled digital signal based on the estimated induced jitter phase modulation $M_1\Theta(t)$.

In another respect, disclosed herein is receive path circuitry, comprising: combiner circuitry configured to combine a radio frequency (RF) input signal with an injected calibration tone having known characteristics to produce a combined output signal including the RF input signal and the calibration tone; bandpass sampling receiver circuitry coupled to receive the combined output signal from the combiner circuitry, the bandpass sampling receiver circuitry configured to receive a sampling clock and to sample the combined output signal using the sampling clock to produce a digital output signal, the sampling clock including associated source clock jitter phase modulation $\Theta(t)$ that induces jitter phase modulation $M_1\Theta(t)$ on the calibration tone and jitter phase modulation $M_2\Theta(t)$ on the RF input signal of the digital output signal from the bandpass sampling receiver circuitry; and processing circuitry coupled to receive and process the digital output signal from the bandpass sampling receiver circuitry by using the known characteristics of the calibration tone to estimate the induced jitter phase modulation $M_1\Theta(t)$ on the calibration tone and to identify and compensate for the source clock jitter phase modulation $\Theta(t)$ in the digital output signal from the bandpass sampling receiver circuitry based on the estimated induced jitter phase modulation $M_1\Theta(t)$.

In another respect, disclosed herein is a method for processing a radio frequency (RF) input signal, including: combining a radio frequency (RF) input signal with an injected calibration tone having known characteristics to produce a combined signal including the RF input signal and the calibration tone; filtering the combined signal with a tunable bandpass filter to produce a filtered combined signal; bandpass sampling the filtered combined signal according to a sampling clock to produce a bandpass sampled digital signal, the sampling clock including associated source clock jitter phase modulation $\Theta(t)$ that induces jitter phase modulation $M_1\Theta(t)$ on the calibration tone and jitter phase modulation $M_2\Theta(t)$ on the RF input signal of the bandpass sampled digital signal; and using the known characteristics of the calibration tone to estimate the induced jitter phase modulation $M_1\Theta(t)$ on the calibration tone and to identify and compensate for the source clock jitter phase modulation $\Theta(t)$ in the bandpass sampled digital output signal based on the estimated induced jitter phase modulation $M_1\Theta(t)$.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The systems and methods disclosed herein provide clock jitter compensation architectures that improve the performance of direct radio frequency (RF) receivers. For these clock jitter compensation architectures, a high frequency tone is injected into the receive radio frequency (RF) signals to allow the clock jitter noise to be identified and compensated for in the output signals provided by the receiver.

It is noted that the clock jitter compensation architectures described herein relate to spur reduction architectures described in U.S. Provisional Patent Application Ser. No. 61/203,115 filed Dec. 18, 2008 and in the concurrently filed U.S. patent application Ser. No. 12/592,777 entitled "SYSTEM AND METHOD FOR IMPROVED SPUR REDUCTION IN DIRECT RF RECEIVER ARCHITECTURES" by Fudge et al., each of which is hereby incorporated by reference in its entirety. As indicated above, the clock jitter compensation architectures described herein are also related to the receiver architectures described in U.S. Pat. No. 7,436,910, entitled "DIRECT BANDPASS SAMPLING RECEIVERS WITH ANALOG INTERPOLATION FILTERS AND RELATED METHODS," and U.S. Pat. No. 7,436,912, entitled "NYQUIST FOLDED BANDPASS SAMPLING RECEIVERS AND RELATED METHODS," each of which is hereby incorporated by reference in its entirety.

Figure 4:
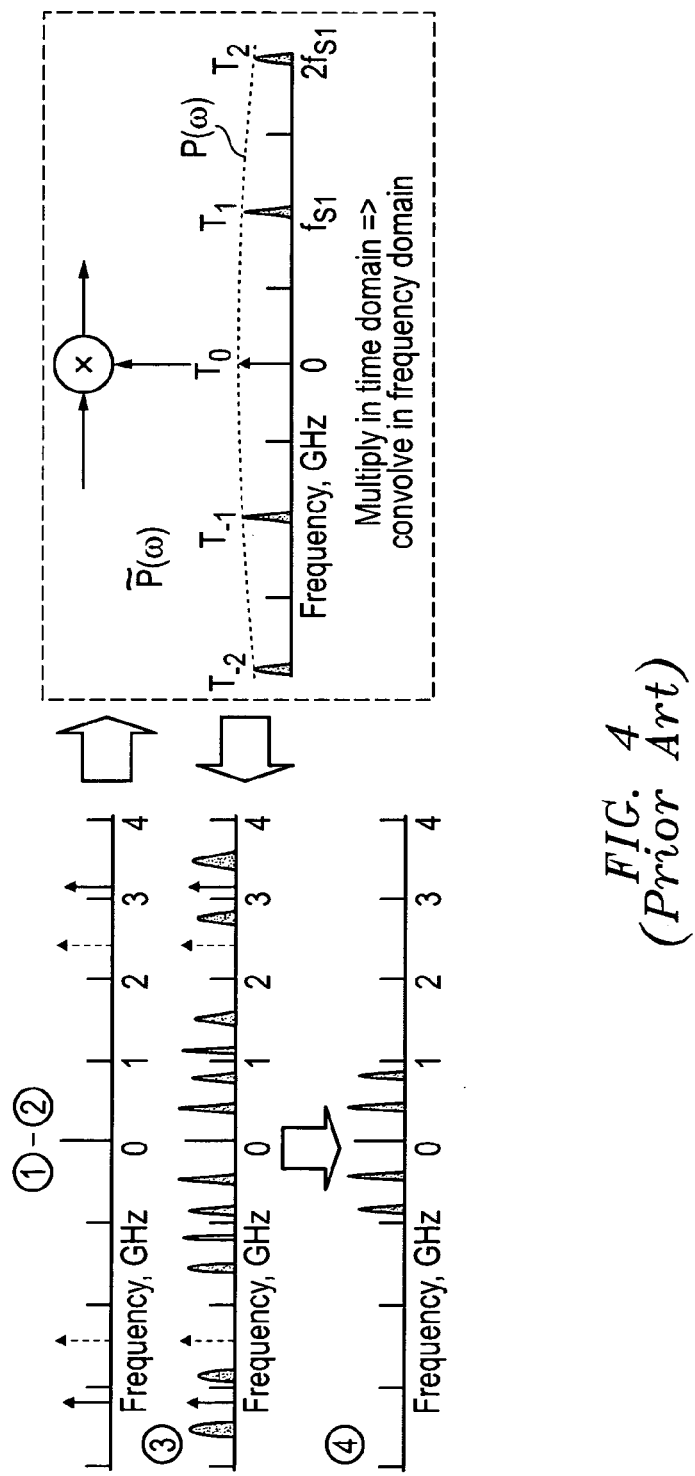
FIG. 4 (Prior Art) is a signal diagram for signal processing provided by the NYFR of FIG. 2.
Figure 5:
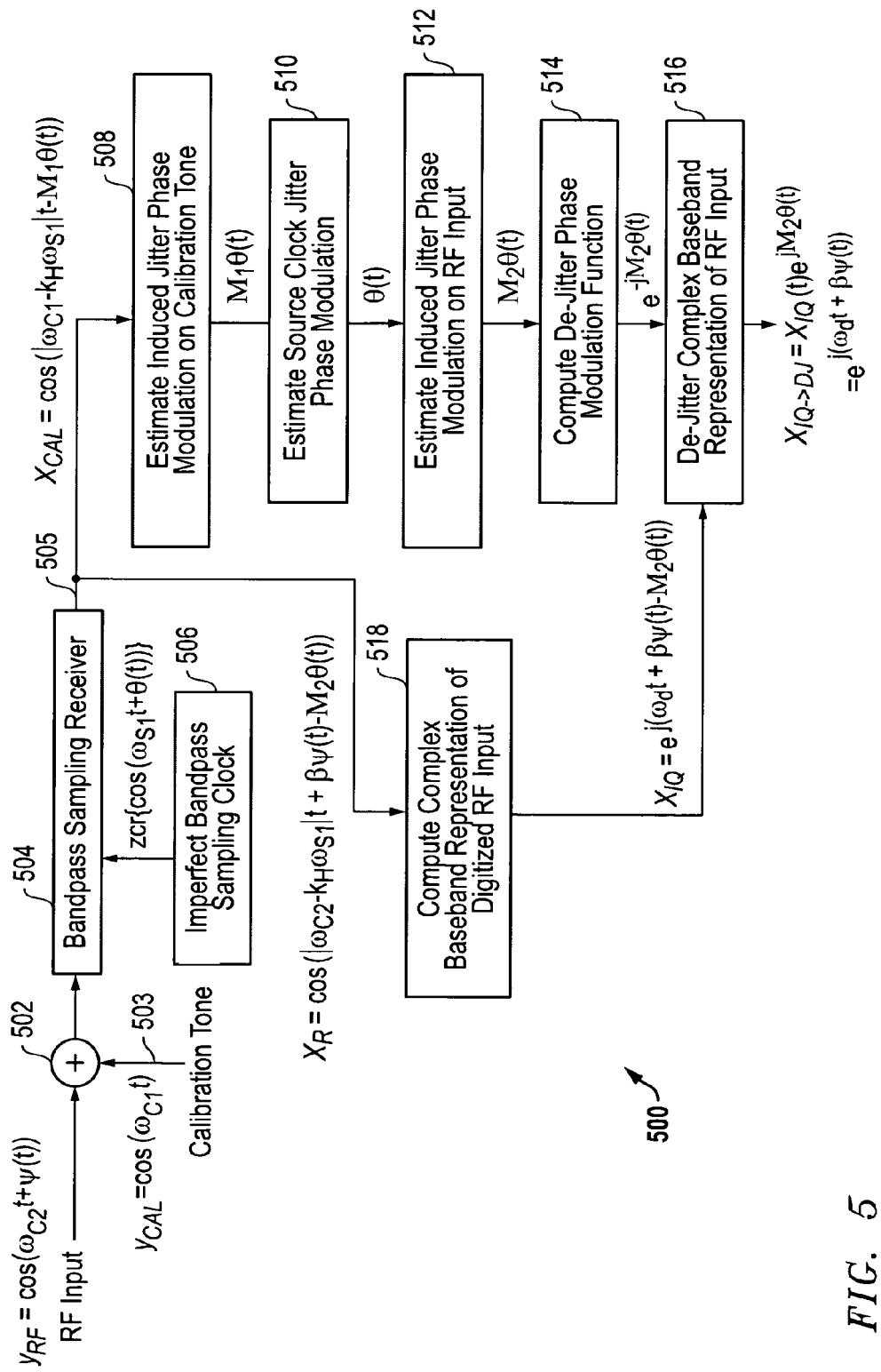
FIG. 5 is a block diagram for a receiver architecture including clock jitter compensation according to one exemplary embodiment.

FIG. 5 provides a block diagram of a clock jitter compensation embodiment of the present invention applied to the case of the RDRFBSR architectures, such as those described in U.S. Pat. No. 7,436,910. This clock jitter compensation is a unique application similar in some respects to the narrow-band modulation used in the NYFR architectures disclosed in U.S. Pat. No. 7,436,912. As such, the signal processing set forth in FIG. 4 would be applicable to the clock jitter compensation architecture of FIG. 5. However, for FIG. 5, the narrow-band frequency modulation of the clock is not deliberate; rather, it is a result of clock jitter. In the NYFR architecture, a known modulation function is induced on the clock, and the modulation scale factor M is not known. With respect to FIG. 5, to de jitter the data, a calibration signal (i.e., pilot tone) is applied to a known Nyquist zone (hence M is known), and the unknown modulation function is then determined. Once the unknown modulation function is determined, the corresponding de-modulation function can be applied to remove the effects of jitter. If the signal band of interest is in a different Nyquist zone from the calibration tone, the estimated de-modulation function is then scaled by the ratio of the modulation scale factor for the Nyquist zone of interest divided by the modulation scale factor for the Nyquist zone of the modulation zone.

Looking back to FIG. 5, embodiment 500 will now be described in more detail. An RF input signal is combined with the calibration tone 503 using combiner 502. The combined output is then processed by a bandpass sampling receiver 504, such as described in U.S. Pat. No. 7,436,910, which uses a bandpass sampling clock 506 to sample the RF input signals. As shown in FIG. 5, this bandpass sampling clock 506 is typically imperfect and has some clock jitter associated with it. The digital output 505 of the receiver 504 is then provided to further processing blocks to provide the jitter identification and compensation provided by the architectures described herein. It is also noted that the mathematical expressions for the signals being processed and utilized are provided in FIG. 5.

In a first path, the digital output 505 is provided to processing block 508 that operates to estimate the induced jitter phase modulation $M_1\Theta(t)$ on the calibration tone 503 that was injected into the RF input signal. Processing block 510 then processes the signals to estimate the source clock jitter phase modulation $\Theta(t)$. Next, processing block 512 processes the signals to estimate the induced jitter phase modulation $M_2\Theta(t)$ on the RF input signals. Further, processing block 514 processes the signals to compute a de jitter phase modulation function that is provided to block 516.

It is noted that modulation scale factor $M_1$ for the calibration tone 503 will typically be equal to modulation scale factor $M_2$ for the RF input signals in embodiments such as FIG. 5 in which an RF input signal is combined with the calibration tone 503 prior to bandpass filter circuitry of bandpass sampling receiver 504, since the calibration tone 503 and RF input signals would be in the same Nyquist zone. However, it is not required that the calibration tone 503 and RF input signals be in the same Nyquist zone, e.g., a calibration tone 503 may be injected slightly out of band of bandpass filter circuitry of bandpass sampling receiver 504 and it might not be strongly attenuated. In such a case, $M_1$ may not be equal to $M_2$.

In a second path, the digital output 505 is provided to processing block 518 that operates to compute a complex baseband representation of the digitized RF input, which is provided to block 516.

Processing block 516 then applies the de jitter phase modulation function from processing block 514 to the complex baseband representation from block processing 518 to output a de jitter complex baseband representation of the RF input. In other words, processing block 516 provides an output for which the clock jitter noise due to the imperfect bandpass sampling clock 506 has been compensated.

Figure 1:
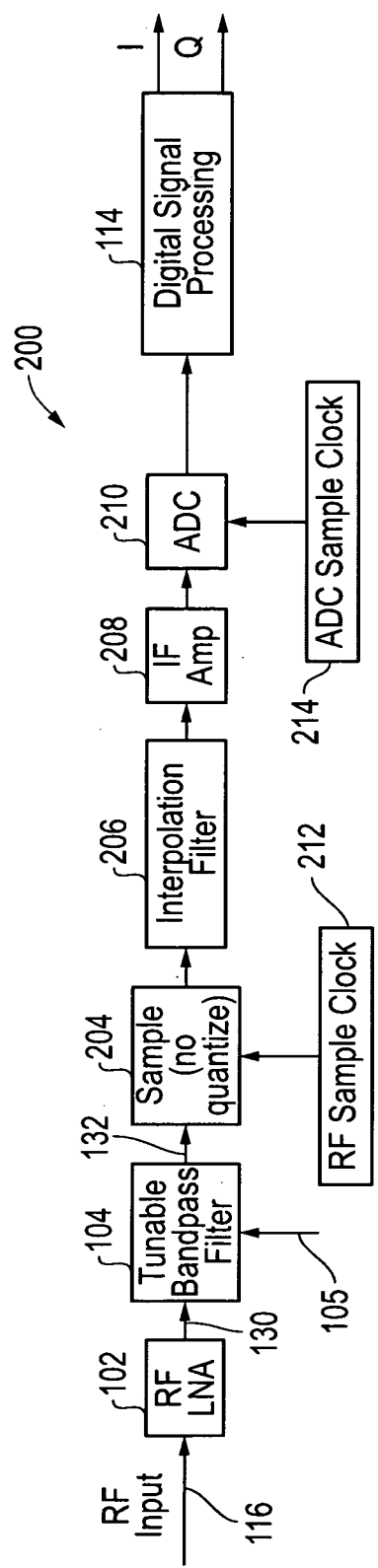
FIG. 1 (Prior Art) is a block diagram for a reconfigurable direct RF bandpass sampling receiver (RDRFBSR).
Figure 2:
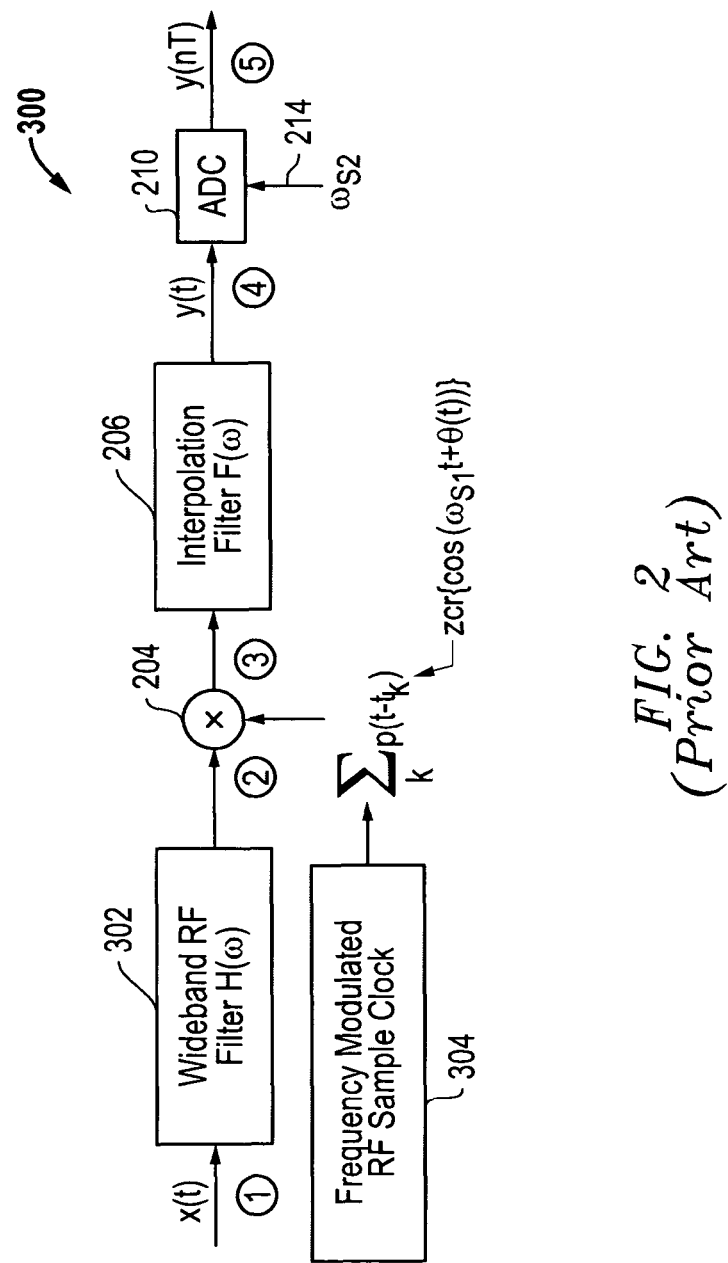
FIG. 2 (Prior Art) is a block diagram for a Nyquist folding receiver (NYFR).
Figure 3:
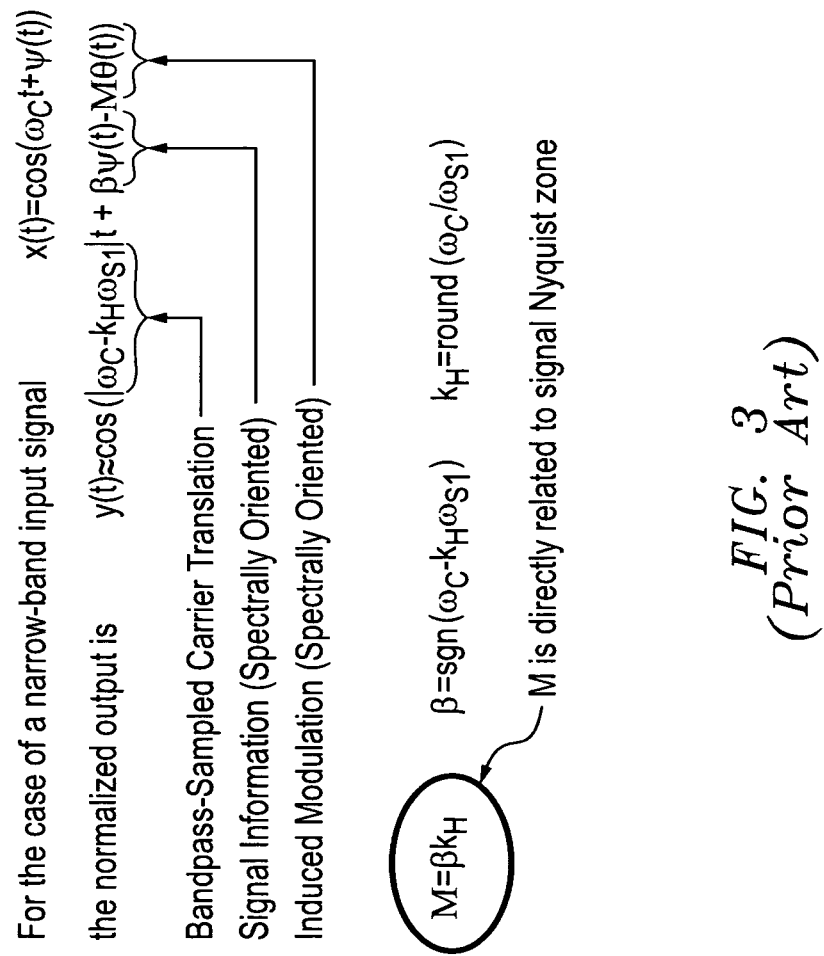
FIG. 3 (Prior Art) provides an explanation of mathematical expressions associated with the NYFR signals.
Figure 6:
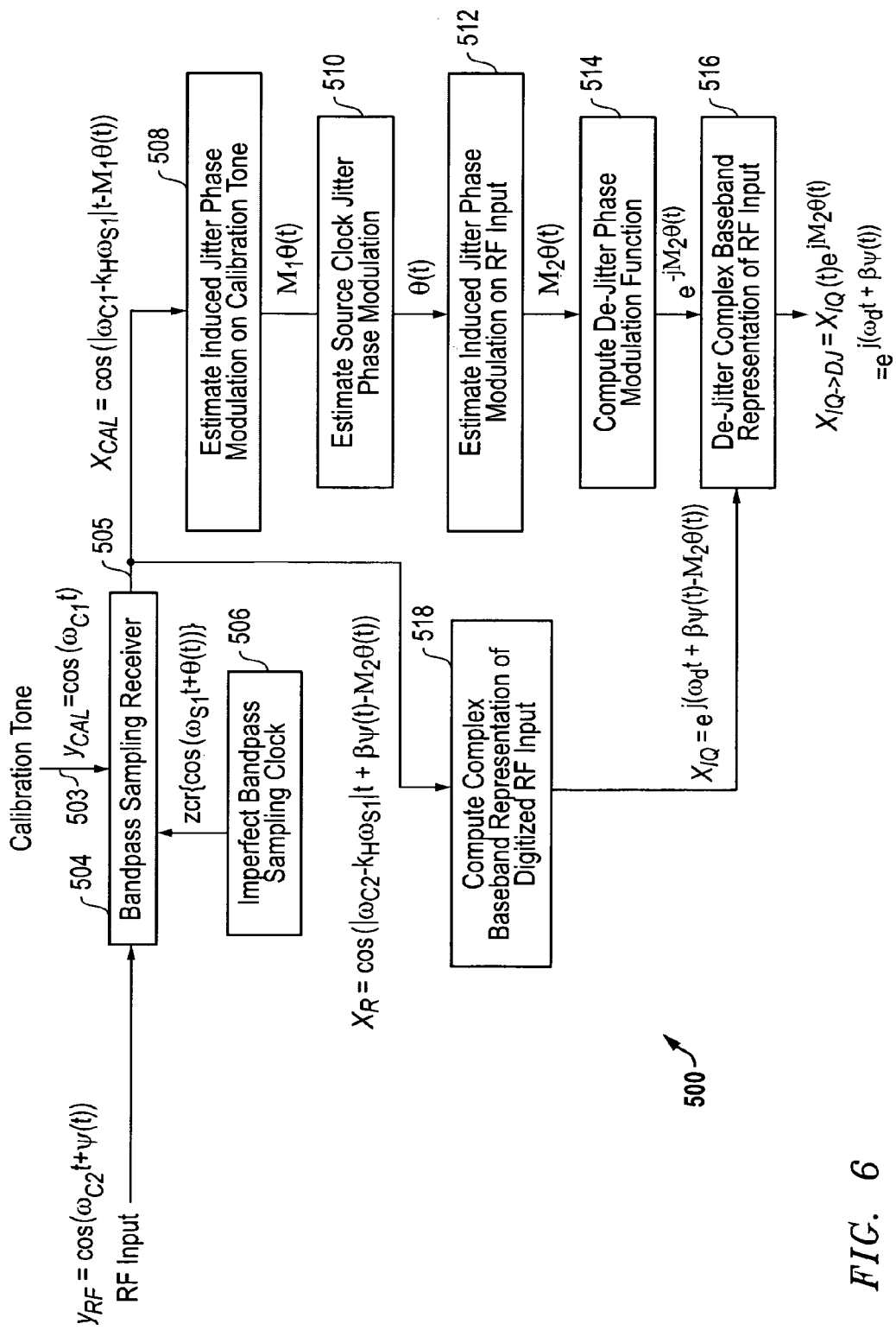
FIG. 6 is a block diagram for a receiver architecture including clock jitter compensation according to one exemplary embodiment.
Figure 7:
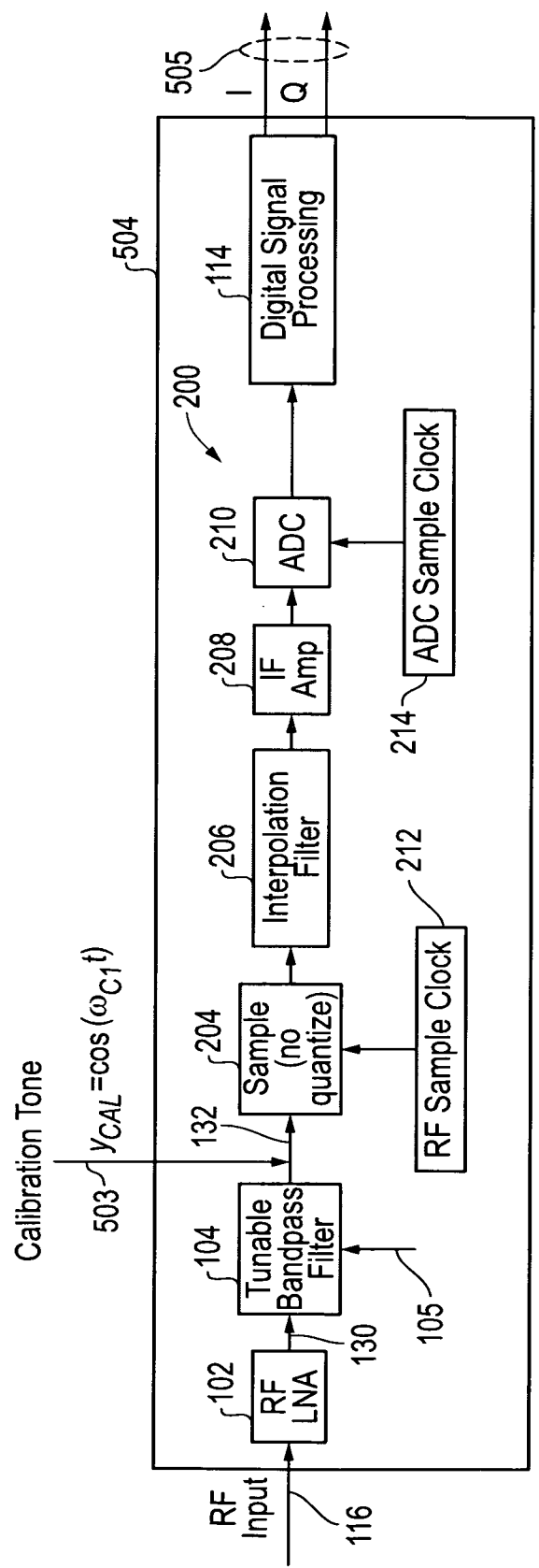
FIG. 7 is a block diagram of a bandpass sampling receiver according to one exemplary embodiment.

Although a calibration tone 503 may be injected prior to the tunable bandpass filter of a bandpass sampling receiver 504 as shown and described in relation to FIG. 5, it will be understood that the calibration tone may alternatively be injected after the tunable bandpass filter of bandpass sampling receiver 504 as shown in FIGS. 6 and 7 so that a single calibration tone may be used, i.e., given that the calibration tone will not have to change each time the tunable bandpass filter is configured to receive a different band of interest. In this regard, FIG. 7 is a block diagram of a bandpass sampling receiver 504 configured with components similar to components of FIG. 1. However, a calibration tone 503 is injected after tunable bandpas's filter 104 and before non-quantizing sampler 204. In such an implementation, modulation scale factor $M_1$ for the calibration tone 503 is not equal to modulation scale factor $M_2$ for the RF input signals since the calibration tone 503 and RF input signals are in different Nyquist zones.

Referring to FIG. 7 in detail, a RF input signal 116 is first passed through a low noise amplifier (LNA) 102. The output 130 of the LNA 102 is provided to a tunable/switchable bandpass filter 104, which may be configured to have a tunable center frequency and a programmable bandwidth dependent upon one or more filter control signals 105. Calibration tone 503 is injected as shown into the filtered output signal 132 from tunable bandpass filter 104, which is then received by the non-quantizing sampler 204. The non-quantizing sampler 204 samples the signals at times determined by the RF sample clock 212 resulting in a discrete time continuous voltage sampled signal. The sampled signal is then filtered by the interpolation filter, resulting in a continuous time continuous voltage signal, which is then sampled and quantized by the ADC 210 at sample rate determined by the ADC Sample Clock 214 after optional amplification by the IF amp 208. The digital output signals from the ADC 210 are then further processed by digital signal processing (DSP) circuitry 114 to produce baseband in-phase path (I) and quadrature path (Q) signals of digital output 505.

As noted above, a Nyquist folded receiver, such as those described in U.S. Pat. No. 7,436,912, could also be used as the receiver 504. The process to de jitter signals for a NYFR architecture, such as described in U.S. Pat. No. 7,436,912, is similar to that for the RDRFBSR architecture, such as described in U.S. Pat. No. 7,436,910. The only difference is that the modulation term for the calibration tone includes a known modulation component in addition to an unknown clock jitter modulation component. The known modulation component can be used to estimate the unknown clock jitter modulation component. Alternatively, because it is not necessary to separate clock jitter from deliberate modulation in the NYFR architecture, both can be lumped together, and the combined modulation can be treated as the NYFR modulation. This NYFR modulation can then be used to de-modulate signals from the other Nyquist zones and/or can be used to estimate the Nyquist zone for the signals by comparing total induced modulation function from a unknown Nyquist zone with known total induced modulation function from a known Nyquist zone.

It is noted that the calibration tone 503 in either case (RDRFBSR or NYFR) is preferably set in a high enough Nyquist zone so as to have a measurable component of jitter modulation. The induced jitter modulation increases with Nyquist zone. If a low Nyquist zone calibration tone is used, the jitter modulation will be very small relative to other noise sources, and an accurate estimate of the jitter modulation may not be possible. It is further noted that the jitter compensation architecture also applies to any type of direct RF sampling architecture in which the jitter phase modulation function is the same for all signals to within an integer scale factor, including architectures that use any form of harmonic sampling (including pulse-based sampling) followed by a harmonic selection or isolation filter (including a low pass or bandpass filter).

The clock jitter compensation architectures described above provide unique and advantageous features. Unique features include the use of jitter compensation as a companion technique to modulation and NYFR demodulation. Advantages include providing a simple approach for significantly removing the effects of jitter thereby increasing signal-to-noise-ratio (SNR) performance and improving performance in nearly all applications for direct RF receivers (e.g., communications, electronic intelligence, radar, etc.) and/or Nyquist folding receivers (e.g., electronic intelligences, electronic support systems, etc.). Further, it is noted that in an alternative embodiment, rather than convert to a complex baseband representation, as discussed above, a real representation could be utilized instead.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. Receive path circuitry, comprising:
    bandpass sampling receiver circuitry configured to receive a sampling clock and to sample a combined radio frequency (RF) signal using the sampling clock to produce a digital output signal, the combined RF signal including a RF input signal and an injected calibration tone, the calibration tone having known characteristics, and the sampling clock including associated source clock jitter phase modulation $\Theta(t)$ that induces a first jitter phase modulation $M_1\Theta(t)$ on the calibration tone and a second jitter phase modulation $M_2\Theta(t)$ on the RF input signal of the digital output signal from the bandpass sampling receiver circuitry such that received signals of all frequencies have the same induced second jitter phase modulation $M_2\Theta(t)$ within a common Nyquist zone; and
    processing circuitry coupled to receive and process the digital output signal from the bandpass sampling receiver circuitry by using the known characteristics of the calibration tone to estimate the induced first jitter phase modulation $M_1\Theta(t)$ on the calibration tone and to identify and compensate for the source clock jitter phase modulation $\Theta(t)$ in the digital output signal from the bandpass sampling receiver circuitry based on the estimated induced first jitter phase modulation $M_1\Theta(t)$;
    where the induced first jitter phase modulation is $M_1\Theta(t)$ having a first integer modulation scale factor $M_1$, and where the induced second jitter phase modulation is $M_2\Theta(t)$ having a second integer modulation scale factor $M_2$.

2. The receive path circuitry of claim 1, wherein the bandpass sampling receiver circuitry comprises a tunable bandpass filter having an input coupled to an input of the bandpass sampling receiver circuitry and an output coupled to the input of sampling circuitry of the tunable bandpass filter; wherein the tunable bandpass filter is configured to receive an RF input signal at the tunable bandpass filter input and to output a filtered RF output signal at the output of the tunable bandpass filter output; wherein the bandpass sampling receiver is coupled to receive the injected calibration tone having known characteristics between the output of the tunable bandpass filter and the input of the sampling circuitry, and to combine the filtered RF output signal with the injected calibration tone having known characteristics to produce a combined output signal including the RF input signal and the calibration tone that is provided to the input of the sampling circuitry.

3. The receive path circuitry of claim 1, wherein the processing circuitry comprises a narrow band filter that operates to estimate the induced first jitter phase modulation $M_1\Theta(t)$ on the calibration tone.

4. The receive path circuitry of claim 1, wherein the calibration tone is applied to a known Nyquist zone such that the value of $M_1$ is known.

5. The receive path circuitry of claim 1, wherein the value of $M_1$ is known, and wherein the processing circuitry comprises a narrow band filter that operates to estimate the induced first jitter phase modulation $M_1\Theta(t)$ on the calibration tone.

6. The receive path circuitry of claim 1, wherein the processing circuitry is configured to:
    estimate the induced first jitter phase modulation $M_1\Theta(t)$ on the calibration tone in the digital output signal based on the known characteristics of the calibration tone,
    estimate the source clock jitter phase modulation $\Theta(t)$ based on the estimated induced first jitter phase modulation $M_1\Theta(t)$ on the calibration tone in the digital output signal,
    estimate the induced second jitter phase modulation $M_2\Theta(t)$ on the RF input signal based on the estimated source clock jitter phase modulation $\Theta(t)$,
    compute a de-jitter phase modulation function based on the estimated induced second jitter phase modulation $M_2\Theta(t)$ on the RF input signal,
    compute a complex baseband representation of the digitized RF input in the digital output signal from the bandpass sampling receiver circuitry, and apply the computed de-jitter phase modulation function to the computed complex baseband representation to produce a de-jittered complex baseband representation of the RF input signal for which the source clock jitter phase modulation $\Theta(t)$ has been compensated.

7. The receive path circuitry of claim 6, wherein the calibration tone is applied to a different Nyquist zone from a Nyquist zone of interest of the sampled RF input signal; and wherein the estimated de-modulation function is scaled by the ratio of the modulation scale factor $M_2$ for the Nyquist zone of interest divided by the modulation scale factor $M_1$ for the Nyquist zone of the modulation zone.

8. The receive path circuitry of claim 1, wherein the sampling clock of the bandpass sampling receiver circuitry comprises a modulated sampling clock; wherein a modulation term for the calibration tone includes a known modulation component in addition to an unknown source clock jitter modulation component $\Theta(t)$; and wherein the processing circuitry is configured to use the known characteristics of the calibration tone and the known modulation component to estimate the first induced jitter phase modulation $M_1\Theta(t)$ on the calibration tone.

9. The receive path circuitry of claim 1, where $M_1$ is the same integer value as $M_2$ within a common Nyquist zone, and where $M_1$ is a different integer value than $M_2$ in different Nyquist zones.

10. A method for processing a radio frequency (RF) input signal, comprising:
  combining a radio frequency (RF) input signal with an injected calibration tone having known characteristics to produce a combined signal including the RF input signal and the calibration tone;
  bandpass sampling the combined signal according to a sampling clock to produce a bandpass sampled digital signal, the sampling clock including associated source clock jitter phase modulation $\Theta(t)$ that induces a first jitter phase modulation $M_1\Theta(t)$ on the calibration tone and a second jitter phase modulation $M_2\Theta(t)$ on the RF input signal of the digital signal such that received signals of all frequencies have the same induced second jitter phase modulation $M_2\Theta(t)$ within a common Nyquist zone; and
  using the known characteristics of the calibration tone to estimate the induced first jitter phase modulation $M_1\Theta(t)$ on the calibration tone and to identify and compensate for the source clock jitter phase modulation $\Theta(t)$ in the bandpass sampled digital signal based on the estimated induced first jitter phase modulation $M_1\Theta(t)$ where the induced first jitter phase modulation is $M_1\Theta(t)$ having a first integer modulation scale factor $M_1$, where the induced second jitter phase modulation is $M_2\Theta(t)$ having a second integer modulation scale factor $M_2$.

11. The receive path circuitry of claim 9, further comprising filtering the RF input signal with a tunable bandpass filter prior to combining the RF input signal with the injected calibration tone; and bandpass sampling the combined signal after combining the RF input signal with the injected calibration tone.

12. The method of claim 10, further comprising using a narrow band filter to estimate the first induced jitter phase modulation $M_1\Theta(t)$ on the calibration tone.

13. The method of claim 10, where the method further comprises applying the calibration tone to a known Nyquist zone such that the value of $M_1$ is known.

14. The method of claim 10, wherein the value of $M_1$ is known and wherein the method further comprises using a narrow band filter to estimate the induced first jitter phase modulation $M_1\Theta(t)$ on the calibration tone.

15. The method of claim 10, where the method further comprises:
  estimating the induced first jitter phase modulation $M_1\Theta(t)$ on the calibration tone in the bandpass sampled digital signal based on the known characteristics of the calibration tone,
  estimating the source clock jitter phase modulation $\Theta(t)$ based on the estimated induced first jitter phase modulation $M_1\Theta(t)$ on the calibration tone in the bandpass sampled digital signal,
  estimating the induced second jitter phase modulation $M_2\Theta(t)$ on the RF input signal based on the estimated source clock jitter phase modulation $\Theta(t)$,
  computing a de-jitter phase modulation function based on the estimated induced second jitter phase modulation $M_2\Theta(t)$ on the RF input signal,
  computing a complex baseband representation of the digitized RF input in the bandpass sampled digital, and
  applying the computed de-jitter phase modulation function to the computed complex baseband representation to produce a de-jittered complex baseband representation of the RF input signal for which the source clock jitter phase modulation $\Theta(t)$ has been compensated.

16. The method of claim 15, further comprising applying the calibration tone to a different Nyquist zone from a Nyquist zone of interest of the sampled RF input signal; and scaling the estimated de-modulation function by the ratio of the modulation scale factor $M_2$ for the Nyquist zone of interest divided by the modulation scale factor $M_1$ for the Nyquist zone of the modulation zone.

17. The method of claim 10, where the method further comprises bandpass sampling the combined signal according to a modulated sampling clock to produce the digital signal, a modulation term for the calibration tone including a known modulation component in addition to an unknown source clock jitter modulation component $\Theta(t)$; and using the known characteristics of the calibration tone and the known modulation component to estimate the induced first jitter phase modulation $M_1\Theta(t)$ on the calibration tone.

18. The method of claim 10, where $M_1$ is the same integer value as $M_2$ within a common Nyquist zone, and where $M_1$ is a different integer value than $M_2$ in different Nyquist zones.

19. Receive path circuitry, comprising:
  combiner circuitry configured to combine a radio frequency (RF) input signal with an injected calibration tone having known characteristics to produce a combined output signal including the RF input signal and the calibration tone;
  bandpass sampling receiver circuitry coupled to receive the combined output signal from the combiner circuitry, the bandpass sampling receiver circuitry configured to receive a sampling clock and to sample the combined output signal using the sampling clock to produce a digital output signal, the sampling clock including associated source clock jitter phase modulation $\Theta(t)$ that induces a first jitter phase modulation $M_1\Theta(t)$ on the calibration tone and a second jitter phase modulation $M_2\Theta(t)$ on the RF input signal of the digital output signal from the bandpass sampling receiver circuitry such that received signals of all frequencies have the same induced second jitter phase modulation $M_2\Theta(t)$ within a common Nyquist zone; and
  processing circuitry coupled to receive and process the digital output signal from the bandpass sampling receiver circuitry by using the known characteristics of the calibration tone to estimate the induced first jitter phase modulation $M_1\Theta(t)$ on the calibration tone and to identify and compensate for the source clock jitter phase modulation $\Theta(t)$ in the digital output signal from the bandpass sampling receiver circuitry based on the estimated induced first jitter phase modulation $M_1\Theta(t)$;

where the induced first jitter phase modulation is $M_1\Theta(t)$ having a first integer modulation scale factor $M_1$, and where the induced second jitter phase modulation is $M_2\Theta(t)$ having a second integer modulation scale factor $M_2$.

20. The receive path circuitry of claim 19, where $M_1$ is the same integer value as $M_2$ within a common Nyquist zone, and where $M_1$ is a different integer value than $M_2$ in different Nyquist zones.

21. A method for processing a radio frequency (RF) input signal, comprising:
combining a radio frequency (RF) input signal with an injected calibration tone having known characteristics to produce a combined signal including the RF input signal and the calibration tone;
filtering the combined signal with a tunable bandpass filter to produce a filtered combined signal;
bandpass sampling the filtered combined signal according to a sampling clock to produce a bandpass sampled digital signal, the sampling clock including associated source clock jitter phase modulation $\Theta(t)$ that induces a first jitter phase modulation $M_1\Theta(t)$ on the calibration tone and a second jitter phase modulation $M_2\Theta(t)$ on the RF input signal of the bandpass sampled digital signal such that received signals of all frequencies have the same induced second jitter phase modulation $M_2\Theta(t)$ within a common Nyquist zone; and
using the known characteristics of the calibration tone to estimate the induced first jitter phase modulation $M_1\Theta(t)$ on the calibration tone and to identify and compensate for the source clock jitter phase modulation $\Theta(t)$ in the bandpass sampled digital output signal based on the estimated induced first jitter phase modulation $M_1\Theta(t)$;
where the induced first jitter phase modulation is $M_1\Theta(t)$ having a first integer modulation scale factor $M_1$, and where the induced second jitter phase modulation is $M_2\Theta(t)$ having a second integer modulation scale factor $M_2$.

22. The method of claim 21, where $M_1$ is the same integer value as $M_2$ within a common Nyquist zone, and where $M_1$ is a different integer value than $M_2$ in different Nyquist zones.

23. Receive path circuitry, comprising:
bandpass sampling receiver circuitry configured to receive a sampling clock and to sample a combined radio frequency (RF) signal using the sampling clock to produce a digital output signal, the combined RF signal including a RF input signal and an injected calibration tone, the calibration tone having known characteristics, and the sampling clock including associated source clock jitter phase modulation $\Theta(t)$ that induces jitter phase modulation $M_1\Theta(t)$ having a first modulation scale factor $M_1$ on the calibration tone and jitter phase modulation $M_2\Theta(t)$ having a second modulation scale factor $M_2$ on the RF input signal of the digital output signal from the bandpass sampling receiver circuitry; and
processing circuitry coupled to receive and process the digital output signal from the bandpass sampling receiver circuitry by using the known characteristics of the calibration tone to estimate the induced jitter phase modulation $M_1\Theta(t)$ on the calibration tone and to identify and compensate for the source clock jitter phase modulation $\Theta(t)$ in the digital output signal from the bandpass sampling receiver circuitry based on the estimated induced jitter phase modulation $M_1\Theta(t)$;
wherein the processing circuitry is configured to:
estimate the induced jitter phase modulation $M_1\Theta(t)$ on the calibration tone in the digital output signal based on the known characteristics of the calibration tone,
estimate the source clock jitter phase modulation $\Theta(t)$ based on the estimated induced jitter phase modulation $M_1\Theta(t)$ on the calibration tone in the digital output signal,
estimate the induced jitter phase modulation $M_2\Theta(t)$ on the RF input signal based on the estimated source clock jitter phase modulation $\Theta(t)$,
compute a de-jitter phase modulation function based on the estimated induced jitter phase modulation $M_2\Theta(t)$ on the RF input signal,
compute a complex baseband representation of the digitized RF input in the digital output signal from the bandpass sampling receiver circuitry, and
apply the computed de-jitter phase modulation function to the computed complex baseband representation to produce a de-jittered complex baseband representation of the RF input signal for which the source clock jitter phase modulation $\Theta(t)$ has been compensated.

24. The receive path circuitry of claim 23, wherein the calibration tone is applied to a different Nyquist zone from the Nyquist zone of the sampled RF input signal; and wherein the estimated de-modulation function is scaled by the ratio of the modulation scale factor for the Nyquist zone of interest divided by the modulation scale factor for the Nyquist zone of the modulation zone.

25. A method for processing a radio frequency (RF) input signal, comprising:
combining a radio frequency (RF) input signal with an injected calibration tone having known characteristics to produce a combined signal including the RF input signal and the calibration tone;
bandpass sampling the combined signal according to a sampling clock to produce a bandpass sampled digital signal, the sampling clock including associated source clock jitter phase modulation $\Theta(t)$ that induces jitter phase modulation $M_1\Theta(t)$ having a first modulation scale factor $M_1$ on the calibration tone and jitter phase modulation $M_2\Theta(t)$ having a second modulation scale factor $M_2$ on the RF input signal of the digital signal; and
using the known characteristics of the calibration tone to estimate the induced jitter phase modulation $M_1\Theta(t)$ on the calibration tone and to identify and compensate for the source clock jitter phase modulation $\Theta(t)$ in the bandpass sampled digital signal based on the estimated induced jitter phase modulation $M_1\Theta(t)$;
where the method further comprises:
estimating the induced jitter phase modulation $M_1\Theta(t)$ on the calibration tone in the bandpass sampled digital signal based on the known characteristics of the calibration tone,
estimating the source clock jitter phase modulation $\Theta(t)$ based on the estimated induced jitter phase modulation $M_1\Theta(t)$ on the calibration tone in the bandpass sampled digital signal,
estimating the induced jitter phase modulation $M_2\Theta(t)$ on the RF input signal based on the estimated source clock jitter phase modulation $\Theta(t)$,
computing a de-jitter phase modulation function based on the estimated induced jitter phase modulation $M_2\Theta(t)$ on the RF input signal, computing a complex baseband representation of the digitized RF input in the bandpass sampled digital, and applying the computed de-jitter phase modulation function to the computed complex baseband representation to produce a de-jittered complex baseband representation of the RF input signal for which the source clock jitter phase modulation $\Theta(t)$ has been compensated.

26. The method of claim 25, further comprising applying the calibration tone to a different Nyquist zone from the Nyquist zone of the sampled RF input signal; and scaling the estimated de-modulation function by the ratio of the modulation scale factor for the Nyquist zone of interest divided by the modulation scale factor for the Nyquist zone of the modulation zone.

* * * * *